United States Patent [19]

Williams

[11] 4,431,029

[45] Feb. 14, 1984

[54] METHOD OF MAKING SHELLS FOR SWING PLATE VALVES

[75] Inventor: Roy Williams, Cranbury, N.J.

[73] Assignee: Satco Div. of Beco Enterprises, Inc., Bridgewater, N.J.

[21] Appl. No.: 336,559

[22] Filed: Jan. 4, 1982

[51] Int. Cl.$^3$ .................... F16K 27/10; B23K 31/02
[52] U.S. Cl. .................................. 137/802; 228/170; 29/156.7 R; 72/338; 137/875
[58] Field of Search ............... 72/338; 29/156.7 R; 228/170, 173 C, 184; 137/802, 875

[56] References Cited

U.S. PATENT DOCUMENTS

| | | | |
|---|---|---|---|
| 325,449 | 9/1885 | Schueler | 137/875 |
| 814,568 | 3/1900 | Stagg | 72/338 |
| 1,898,883 | 2/1933 | Matheson | 72/338 X |
| 2,362,544 | 11/1944 | Eckberg | 228/173 C |
| 2,771,665 | 11/1956 | Beatty | 72/338 X |
| 3,979,809 | 9/1976 | Schneider | 228/170 X |

Primary Examiner—Kenneth J. Ramsey
Attorney, Agent, or Firm—H. Hume Mathews

[57] ABSTRACT

A method of forming a flat plate swing valve shell from a commercially available forged or swaged pressure vessel head having circular sections in horizontal planes and elliptic sections in vertical planes. The shell is formed by cutting the head along a vertical axis to form two halves, rotating the halves outwardly with respect to each other and repositioning them so their original base edges are juxtaposed and the two halves form a continuous enclosure having an open base and which has elliptic sections in both vertical and horizontal planes, and welding the two halves along said base edges to form a unitary valve shell.

4 Claims, 11 Drawing Figures

METHOD OF MAKING SHELLS FOR SWING PLATE VALVES

DESCRIPTION

1. Technical Field

This invention is in the field of pressure containing valve shells for large aperture swing plate valves, which are used for the diversion of gas flows in large volume.

2. Background of the Invention

Large aperture swing plate valves of the type involved in the present invention comprise a main inert conduit connected to two branching (outlet) conduits which diverge from the main conduit in the form of an inverted "Y". A swing plate is mounted internally of the conduits at their intersection. This plate may be swung between two opposed positions, to alternatively cover or uncover parts leading to the branch conduits and thus divert the gas flow from the main conduit into one or the other of the branch conduits as desired.

The exterior contour of these large aperture swing plate valves is generally cylindrical at the main entrance conduit end and generally elliptical at the branching conduit (outlet) ends, due to the side by side arrangement of the branching conduits.

A shell of the type previously used for enclosing these valve is shown in FIG. 1 of the accompanying drawings. They are expensive to make and require stiffening ribs for strength and rigidity. The structure is so large, and the shape so unusual, that the cost of manufacturing a swaged or forged shell has been prohibitive. Therefore the prior art shells have been constructed by welding together a number of rolled steel plates and ribs of various shapes, as shown in FIG. 1, even though a swaged or forged shell would have been preferable and a method been available for manufacturing such a shell at a reasonable cost.

SUMMARY OF THE INVENTION

According to the present invention, a manufacturing method for a forged or swaged shell for a large aperture swing plate valve is provided at a low cost of manufacture, thereby making it commercially feasible to utilize forged or swaged ferrous metal for such shells.

The manufacturing method of the present invention enables the blank or stock from which the shell is to be made to be a standard commercially available pressure vessel head. Such heads are manufactured and sold in relatively large quantities at a relatively low cost. They normally are used commercially as the end; or ends, of large ferrous pressure vessels such as shown in FIG. 4 of the accompanying drawings. These heads are strong and rigid and have the properties and characteristics necessary for swing plate valve shells. However, their form and shape is not that required for such rise, and their reforging to such shape would be impractical because of the prohibitive costs involved.

By the present invention a method is provided whereby such pressure heads can be changed from their original shape to one that is highly suitable for use as a swing plate valve shell, at a very low cost and without re-forging or reforming the metal of the pressure heads in any way. All that is required according to the present invention is to make a single cut through a standard pressure head at a particular location to form two halves, then to rotate each half to a particular position relative to the other half as hereinafter described, and then to weld together the repositioned halves in their new location relative to each other. The method is simple when looked at by hindsight; yet for the first time makes commercially feasible, the manufacture of forged or swaged ferrous metal shells for large aperture swing plate valves.

BEST MODE FOR CARRYING OUT THE INVENTION

Figure 1:
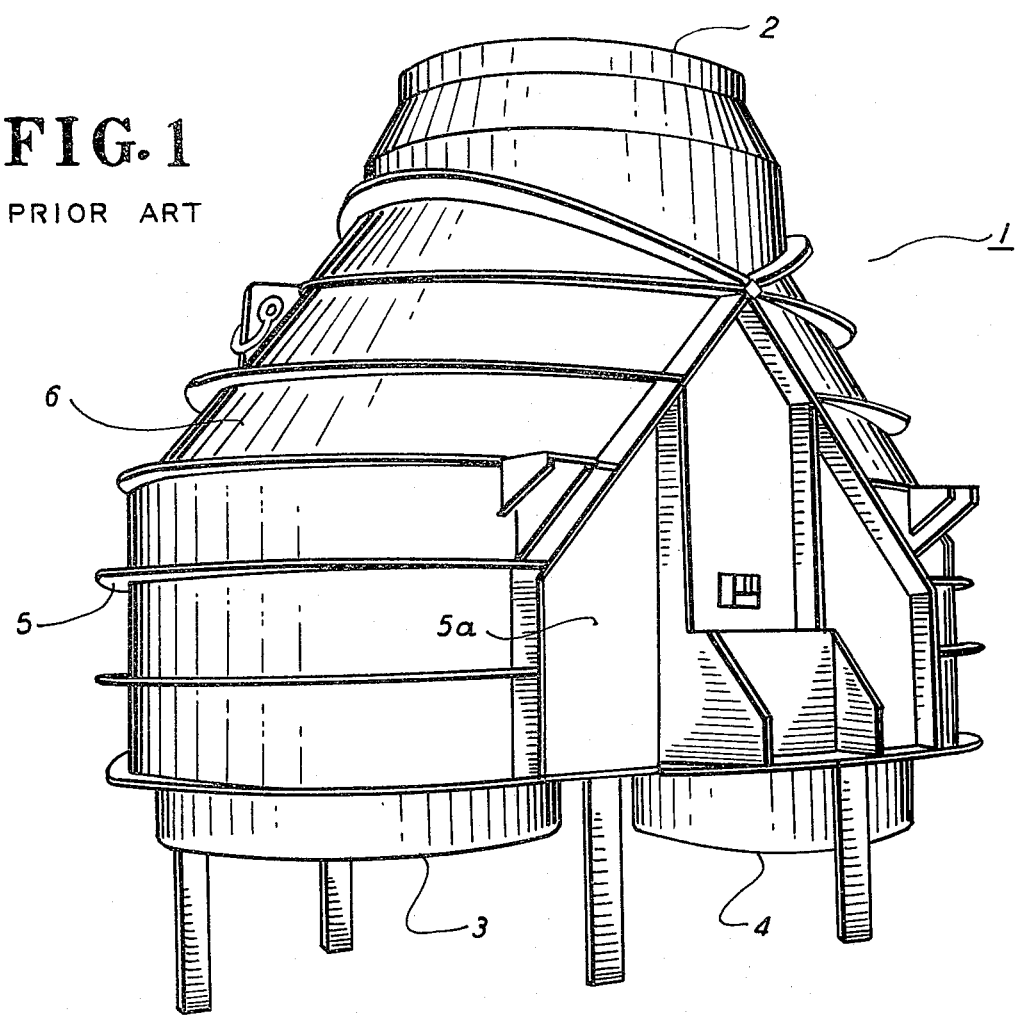
FIG. 1 shows the flat plate swing valve shell of the prior art including the lower outlet ports and upper inlet port.

Referring to FIG. 1, the plate swing valve 1 of the prior art, is shown having an upper inlet port 2 and a pair of lower outlet ports 3 and 4. The upper portion of the valve 1 is generally conical, having a wide lower end, adjacent the pair of outlet ports 3 and 4, and tapering to an upper portion adjacent the inlet port, where it is truncated.

Prior art plate swing valve 1 is constructed of flat plate steel, typically SA 515 grade 60, which is cut, rolled and formed into a variety of shaped sections. The sections are welded together to form the valve shown in FIG. 1.

In forming a plate swing valve by the above procedure, the geometry results in stress raisers which cause the valve to be weak and susceptible to rupture. In order to prevent distortion, the prior art valves included stiffeners 5 at the flat surface. These stiffeners 5 enable the valve to maintain its rigidity when the internal pressure increases.

The cylindrical and conical portions of the prior art valve shell are formed of curved strips 6 of steel which are cut and rolled. The front and back faces 5a of the valve remain flat. A horizontal cross-section would be roughly elliptical having flat sides along its major axis. These flat sides must be supported by additional stiffeners to prevent the flat sides from "bowing" from within.

The present invention provides swing plate valve shells that can be constructed from pressure vessel heads made from ferrous metal forgings which are available as standard articles of commerce, and which according to the method of the invention can be made into unitary shells providing the benefits of forged ferrous metal and obviating the disadvantages of welded and rolled plates and rib construction.

Figure 2:
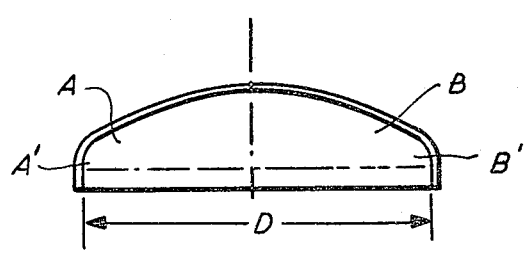
FIGS. 2 & 3 show, respectively, a vertical cross-section and a plan view of the dish-shaped pressure vessel head to construct the plate swing valve shell of the present invention.
Figure 3:
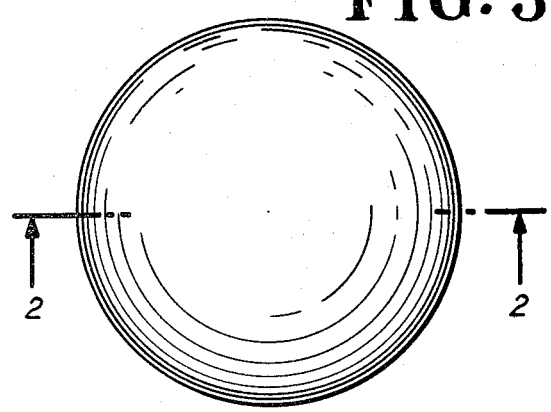
Figure 4:
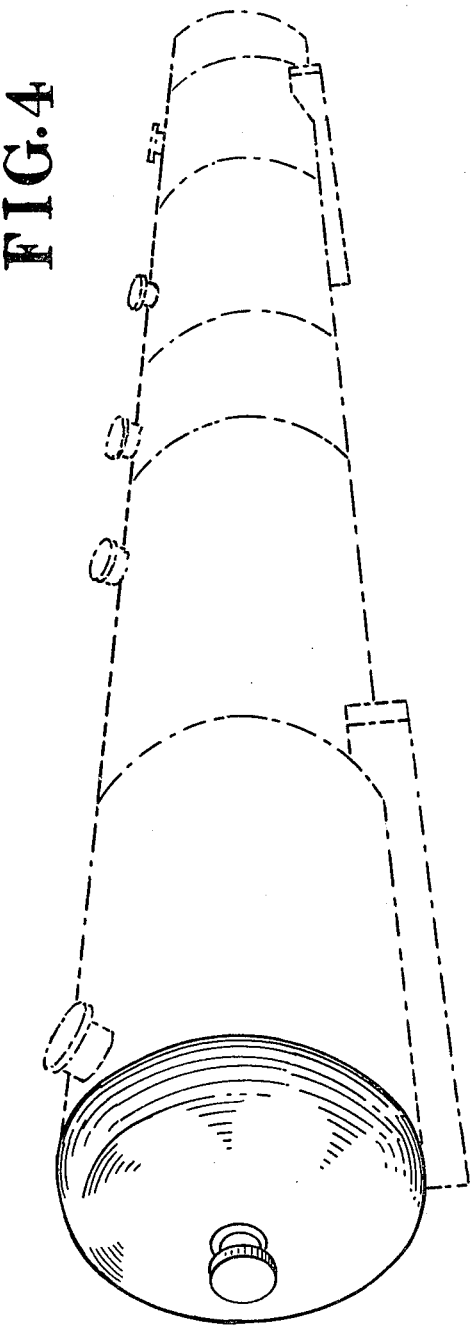
FIG. 4 shows the pressure vessel head of FIGS. 2 and 3 as normally used, in place on a pressurized tank shown in phantom.

FIGS. 2 and 3 each show a pressure vessel head which is used to cap the end of a variety of pressurized cylindrical vessels such as that shown in FIG. 4 of the drawings. These are commercially available at a fraction of the cost of constructing swing plate valve shells of the prior art, as shown in FIG. 1.

Heads of this type shown in FIGS. 2 and 3 are normally available in two shapes. FIG. 2 shows a generally spheroidal dish-shaped head having circular horizontal cross-sections with an outer diameter shown as D in FIG. 2. Vertical cross-sections are elliptic. The diameter D of the dish-shaped head is used to define the shape of the dome of the head.

The dome of the head, as shown by the cross-section of FIG. 2 is defined by a pair of circles. The first circle (from Point A to Point B) can be defined by the general formula for a circle; and point (x,y,) along the circumference being equidistant from its center by a radius "r", where r is the radius of the circle and 2r is the diameter.

The first circle is formed so that its diameter (2r) would be 80% of the outer diameter (D) of the generally spheroidal head.

The second circle (from Points A to A' and B to B') are defined by the radius "r'", where r' is the radius of the circle and 2r' is the diameter.

The circle defined by the radius r' is formed so that the diameter 2r' is 10% of the outer diameter D of the spherical head. This creates a head having a gradual curve at its upper portion; and a sharper curve at its edges. Below the second circle the lower end of the head is formed by an annular cylindrical ring section so that the lower end is virtually straight. Pressure heads of this type are commonly referred to in the art as "80-10 heads".

Other pressure heads also commercially available which can be employed in the present invention are "100-6 heads", where the large circular section has a diameter equal to that of the head, and the smaller circular sections have a diameter of 5% of that of the head.

Figure 3A:
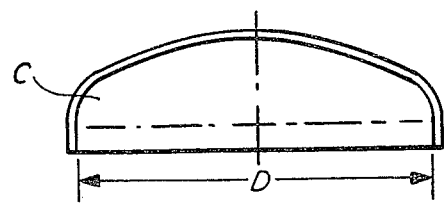
FIG. 3A shows a dish-shaped pressure vessel head of slightly modified shape, which also can be used to make swing plate valve shells by the method of the invention.

FIG. 3A shows a second dish-shaped head having an elliptical vertical cross-section and a circular horizontal cross-section. The first dome-section (from Points C to D) of the vertical cross-section is defined by the general formula for ellipse:

$$(X^2/a^2)+(y^2/b^2)=C$$

where points having coordinate (x,y) form a perimeter of the ellipse having a major axis of a and a minor axis of b.

The second dome-section, from C and D to the bottom as seen in FIG. 3A is formed by an annular cylindrical ring section. Thus the head is elliptical at its upper end and virtually straight along its lower sides.

Any of the above described pressure vessel heads can be used to form the plate swing valve shell of the present invention.

In order to conform the pressure vessel head of FIGS. 2 or 3A to the shape desired for use as a flat plate swing valve shell; the head is cut and then the sections are rearranged.

Figure 5:
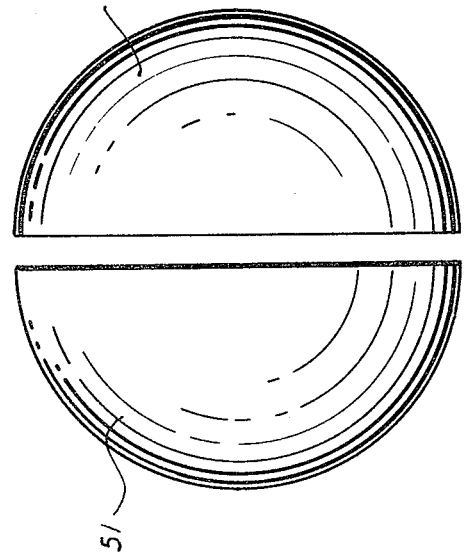
FIG. 5 shows the step of cutting the pressure vessel into two sections.

FIG. 5 shows the first step of the precess, whereby a diametrical cut is made through the head dividing it into two substantially equivalent sections 51 and 52. This cut can be accomplished by any means which would yield a clean cut. For example, an oxy-acetylene cutting torch may be used.

Figure 6:
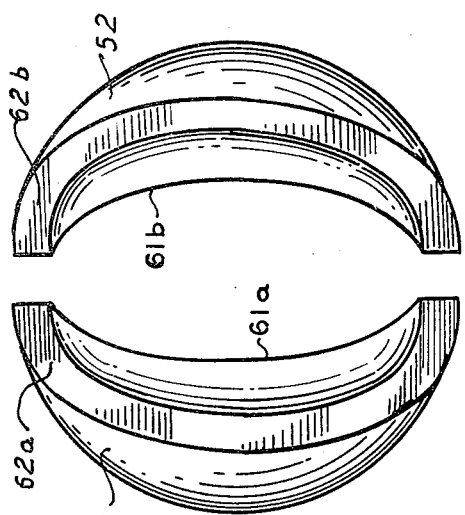
FIG. 6 shows the two sections of the pressure vessel head being rotated and rearranged.

The two halves are then rotated as shown in FIG. 6 through a 90° angle about an axis that is formed by the intersection of the vertical plane through which the cut is made and the horizontal plane of the base. The halves of the semicircular outer rim 61a and 61b now meet at junction 61 and a new outer rim or base 62 is formed by the rim 62a and 62b formed along each side of the diametrical cut.

A seam 61 is created by the junction of the outer rim 61a and 61b.

Figure 7:
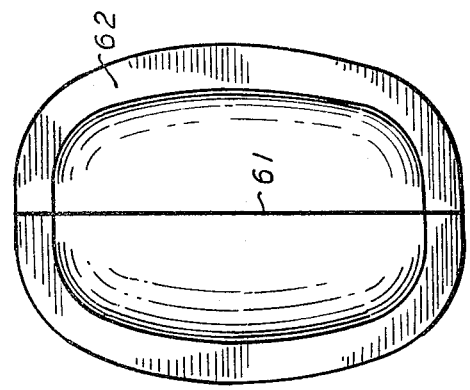
FIG. 7 shows the resultant configuration after the two sections have been rearranged.

FIG. 7 shows the two sections put back together in a new arrangement so that it has an opening which is roughly elliptical, formed by new outer rim 62.

Figure 8:
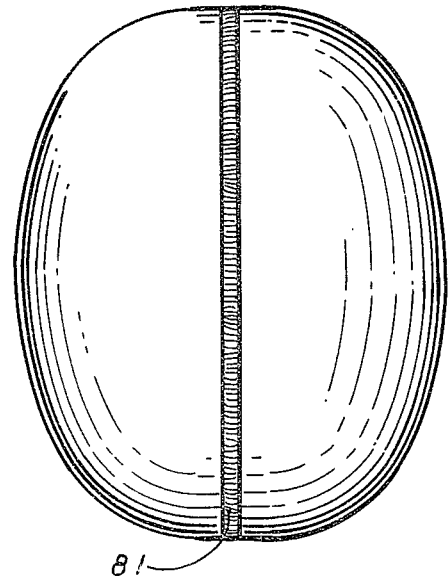
FIG. 8 shows the pressure vessel head now rearranged to form the plate swing valve shell, having been welded along the seam.

The two rearranged sections are then welded together along the weld seam 81 shown in FIG. 8.

Figure 9:
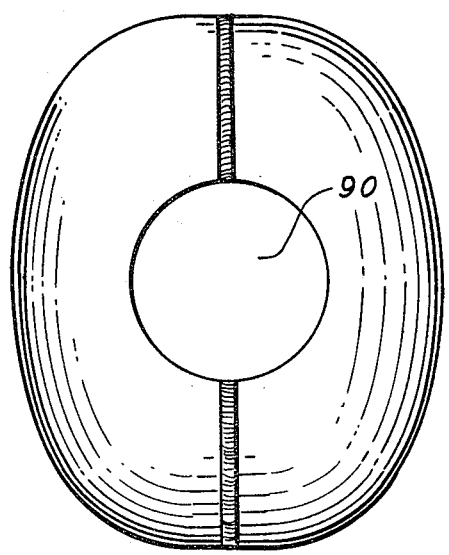
FIG. 9 shows the newly formed plate swing valve shell having an upper opening cut therethrough.

In order to allow the gas to pass through the valve a centrally located entry opening 90, (see FIG. 9) is cut through the dome. A cylindrical conduit 92 (see in FIG. 10) is attached adjacent to and extending up from entry opening 90 to form an inlet port 95 for the inflow of gas.

Figure 10:
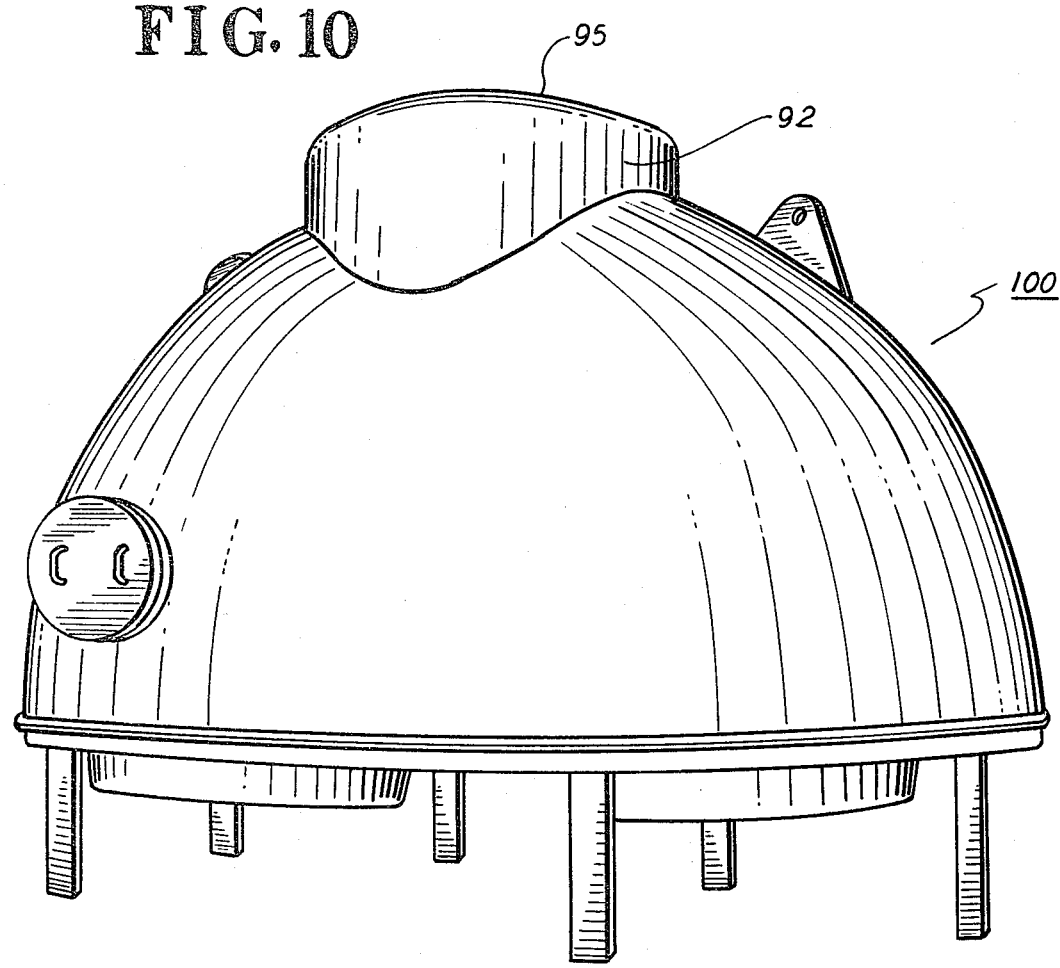
FIG. 10 shows the completed swing plate valve shell positioned in place over the swing plate valve base, and showing the upper inlet conduit and the lower branching conduits (outlets) protruding therefrom.

FIG. 10 shows the complete arrangements of the plate swing valve 100 of the present invention. The shell and its outer surface is smooth and rounded. No stiffening ribs, or other stress raisers, are necessary or present.

The resultant plate swing valve 100, will have a horizontal cross-section which is roughly elliptical. This elliptical cross-section eliminates the parallel flat faces that are present in the prior art plate swing valves (see FIG. 1). The rounded front faces of plate swing valve 100 allow it to withstand a higher degree of internal pressure and temperature than was possible with the prior art valve.

The bottom base plate is welded in place, around the two downwardly branched (outlets) to form a complete gas-tight pressure containing enclosure or shell for the flat plate swing valve.

I claim:

1. A method of manufacturing forged ferrous metal shells for swing plate valves comprising cutting into two halves in the plane of its vertical axis a dish-shaped forged ferrous metal pressure head for a cylindrical pressure vessel, said head being characterized by a wall which is circular in section where intersected by horizontal planes normal to the vertical axis of said head, and which is elliptic in section where intersected by vertical planes which include said vertical axis, rotating said halves outwardly through a ninety degree angle so that the original base edges of said head are now juxtaposed and the edges on opposite sides of said cut now form the base rim of a pressure head which is generally elliptic in both horizontal as well as vertical cross-section and welding said halves together along the seam formed by said juxtaposed edges.

2. The method of forming a flat plate swing valve shell comprising in combination the steps of:
    (a) cutting a commercially available pressure vessel head having a first dome-shaped vertical cross-section, and a circular base in half along its vertical diameter, thereby forming a pair of substantially equivalent half-dome sections each having a semicircular base;
    (b) rotating each of said half-dome sections through a 90° angle about the axis of the intersection of the plane of said circular base and the plane of said vertical diameter, thereby aligning the perimeters of said semi-circular base to form a seam therebetween;

(c) bonding said rotated half-dome sections along said seam, thereby forming a valve shell having a second dome-shaped vertical section and an elliptical base;

(d) cutting an upper circular opening symmetrically about the apex of said dome-shaped valve shell;

(e) forming a cylindrical entry port adjacent said upper circular opening; and (f) bonding said cylindrical entry port to said dome-shaped valve shell above said circular opening.

3. A product manufactured by the method of claim 1.

4. A product manufactured by the method of claim 2.

* * * * *